(12) United States Patent
De Magalhaes (10) Patent No.: US 9,679,070 B2
(45) Date of Patent: *Jun. 13, 2017

(54) DECLARATIVE AND ADAPTIVE CONTENT MANAGEMENT

(71) Applicant: INTERNATIONAL BUSINESS MACHINES CORPORATION, Armonk, NY (US)

(72) Inventor: Arthur L. De Magalhaes, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/249,688

(22) Filed: Aug. 29, 2016

(65) Prior Publication Data

US 2016/0364493 A1 Dec. 15, 2016

Related U.S. Application Data

(63) Continuation of application No. 14/499,996, filed on Sep. 29, 2014, now Pat. No. 9,503,508.

(51) Int. Cl.
*H04L 29/06* (2006.01)
*G06F 17/30* (2006.01)
(Continued)

(52) U.S. Cl.
CPC .. *G06F 17/30867* (2013.01); *G06F 17/30864* (2013.01); *G06F 21/31* (2013.01);
(Continued)

(58) Field of Classification Search
CPC .......... H04L 63/08; H04L 67/06; H04L 67/42
(Continued)

(56) References Cited

U.S. PATENT DOCUMENTS

| 8,396,989 B2 | 3/2013 | Chaturvedi et al. |
| 2011/0071841 A1 | 3/2011 | Fomenko et al. |

(Continued)

FOREIGN PATENT DOCUMENTS

WO 2013107681 A1 7/2013

OTHER PUBLICATIONS

Cohen, B. "The BitTorrent Protocol Specification". Created on: Jan. 10, 2008, Modified on: Oct. 20, 2012. V. becdd9a11e68ace72751306b3d59146ed648e6fe. <http://www.bittorrent.org/beps/bep_0003.html>.

(Continued)

*Primary Examiner* — Hadi Armouche
*Assistant Examiner* — Angela Holmes
(74) *Attorney, Agent, or Firm* — John W. Hayes; William H. Hartwell (57) ABSTRACT

A computer-implemented method for content management across multiple server computers includes receiving operational information associated with each of two or more local server computers. The computer determines a strategy for transferring a file between a central server computer and a client device using the two or more local server computers based, at least in part, on the operational information associated with each of the two or more local server computers. The computer transfers based on the strategy, a first portion of the file between a first local server computer and the central server computer, wherein the first local server computer is one of the two or more local server computers. The computer transfers, based on the strategy, a second portion of the file between a second local server computer and the central server computer, wherein the second local server computer is one of the two or more local server computers.

20 Claims, 5 Drawing Sheets

(51) Int. Cl.
*H04L 29/08* (2006.01)
*G06F 21/31* (2013.01)

(52) U.S. Cl.
CPC .............. *H04L 63/08* (2013.01); *H04L 67/06* (2013.01); *H04L 67/10* (2013.01); *H04L 67/1097* (2013.01); *H04L 67/42* (2013.01)

(58) Field of Classification Search
USPC .......................................................... 726/7
See application file for complete search history.

(56) References Cited

U.S. PATENT DOCUMENTS

| | | |
|---|---|---|
| 2013/0046982 A1 | 2/2013 | Suh et al. |
| 2013/0110854 A1 | 5/2013 | Lockhart et al. |
| 2013/0111326 A1 | 5/2013 | Lockhart et al. |
| 2013/0132584 A1 | 5/2013 | Palladino et al. |
| 2013/0297680 A1 | 11/2013 | Smith et al. |
| 2014/0020072 A1 | 1/2014 | Thomas |
| 2014/0068254 A1 | 3/2014 | Scharf et al. |
| 2014/0068737 A1 | 3/2014 | Micucci et al. |
| 2014/0115116 A1 | 4/2014 | Motes et al. |
| 2016/0094617 A1 | 3/2016 | De Magalhaes |
| 2016/0094618 A1 | 3/2016 | De Magalhaes |

OTHER PUBLICATIONS

"CloudHub—unifies all your cloud storage into one account". [online][Retrieved on: Jun. 4, 2014]. <http://www.egistec.com/en/cloud/cloudhub.aspx>. Copyright 2011 EgisTec Inc.

"Integrated Cloud Content-bigtincan". [online][Retrieved on: Jun. 4, 2014]. <http://www.bigtincan.com/en/products/bigtincan-hub/cloud-content>. Copyright 2014 bigtincan.com.

Original U.S. Appl. No. 14/499,996, filed Sep. 29, 2014.
Original U.S. Appl. No. 14/867,488, filed Sep. 28, 2015.
Appendix P List of IBM Patents or Patent Applications Treated as Related. Dated Aug. 25, 2016. Two pages.

DECLARATIVE AND ADAPTIVE CONTENT MANAGEMENT

BACKGROUND

Internet based storage solutions allow for a connection to a server by a user uploading/downloading content manually from the server. Such storage solutions require the user to have knowledge of the content that is needed every time the online storage is accessed. Currently, there are client-based programs that allow for start-pause-start access to particular storage content, where the user can manually initialize a download, pause the download, and resume the download at a later time. This logic pertaining to the content is stored on the client side rather than the server side, so that the user has manual control over downloading the content. There are instances where a user might not always stay connected to a single hub (i.e., local server) during the entirety of a download. In instances where the user might travel across multiple hubs, the user has to manually access the client-based program, pause download operations at the first hub, and resume the download operations once the user has reached the second hub.

SUMMARY

Embodiments in accordance with the present invention disclose a method, computer program product and computer system for content management across multiple server computers. A computer-implemented method includes receiving, by one or more processors, operational information associated with each of two or more local server computers; determining, by one or more processors, a strategy for transferring a file between a central server computer and a client device using the two or more local server computers based, at least in part, on the operational information associated with each of the two or more local server computers; transferring, by one or more processors, based on the strategy, a first portion of the file between a first local server computer and the central server computer, wherein the first local server computer is one of the two or more local server computers; and transferring, by one or more processors, based on the strategy, a second portion of the file between a second local server computer and the central server computer, wherein the second local server computer is one of the two or more local server computers.

DETAILED DESCRIPTION

Embodiments in accordance with the present invention allow for declarative anticipatory interaction between content and server computers. Interactions between a user and content include the uploading and downloading of content (e.g., a music file) across multiple local server computers. Embodiments in accordance with the present invention can send content stored on a central server computer to local server computers based on the local server computer declared by the user, prior to connecting to the local server computer. Embodiments in accordance with the present invention can receive a request to transfer a file and a list of local server computers, wherein the local server computers transfer the file between the central server computer and a client device. Based on operational information associated with each of the local server computers and a duration of connectivity between each of the local server computers and the client device, embodiments in accordance with the present invention can determine a strategy for the file across the local server computers based on the operational information associated with each of the local server computers.

Figure 1:
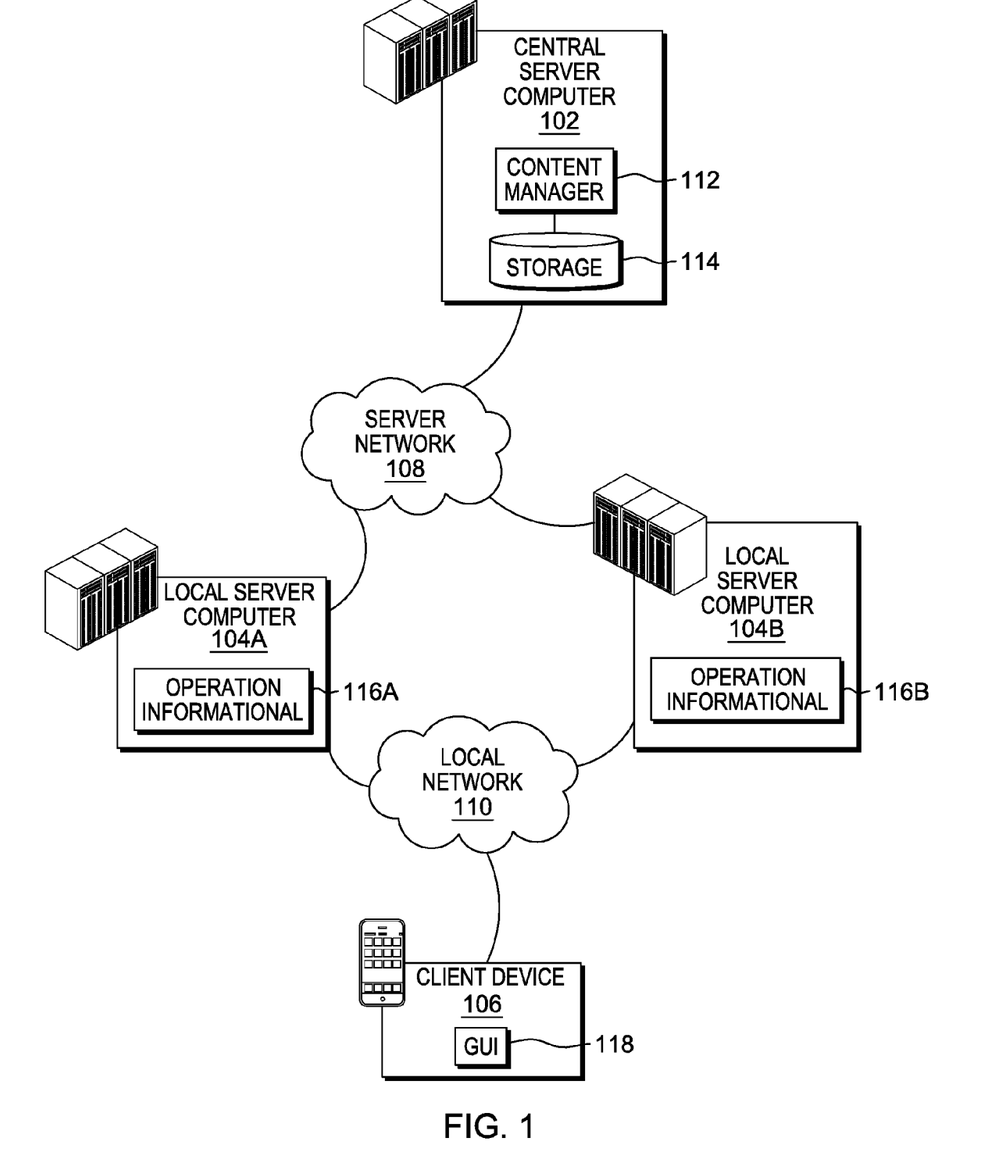
FIG. 1 is a functional block diagram illustrating a distributed data processing environment, in accordance with an embodiment of the present invention.

Example embodiments in accordance with the present invention will now be described in detail with reference to the drawing figures. FIG. 1 is a functional block diagram illustrating a distributed data processing environment, in accordance with one embodiment of the present invention. The distributed data processing environment includes central server computer 102, local server computer 104A, and local server computer 104B, interconnected over server network 108. Local server 104A and local server computer 104B connect to client device 106 over local network 110.

Central server computer 102 represents a computer system utilizing clustered computers and components that act as a single pool of seamless resources when accessed through server network 108, as is common in data centers and with cloud computing applications. In general, central server computer 102 is representative of any programmable electronic device or combination of programmable electronic devices capable of executing machine-readable program instructions and communicating with other computer devices via a network.

Local server computer 104A and local server computer 104B each represents a computer system utilizing clustered computers and components that act as a single pool of seamless resources when accessed through local network 110 by a user of client device 106, as is common in data centers and with cloud computing applications. Local server computer 104A and local server computer 104B represent hubs which act as channels to central server computer 102 through which data can be transferred. For discussion purposes, local server computer 104A operates independently from local server computer 104B. Operational information 116A and operational information 116B represent historical and current statuses of local server computer 104A and local server computer 104B, respectively. Historical and current statuses can include downloading and uploading rates, an amount of connected devices, an amount of available bandwidth, scheduled online and offline intervals, and reliability measures for downloading and uploading files.

Content manager 112 manages the distribution and collection of files across multiple local hubs such as, local server computer 104A and local server computer 104B. Content manager 112 can receive a request to download a file across local server computer 104A and 104B and determine a download strategy for the file based on operational information 116A and 116B, respectively. Similarly, content manager 112 can receive a request to upload a file across local server computer 104A and 104B and determine an uploading strategy based on historical data in operational information 116A and 116B, respectively. Content manager 112 can also alter the downloading and uploading strategy based on current data in operational information 116A and 116B to ensure the downloading and uploading strategy is able to fulfill the download or upload request. Files being uploaded or downloaded according to strategies implemented by content manager 112 are stored in storage 114.

In general, server network 108 can be any combination of connections and protocols that can support communications between central server computer 102, local server computer 104A and local server computer 104B. Local network 110 can be any combination of connections and protocols that can support communications between local server computer 104A, local server computer 104B, and client device 106. Typically, server network 108 and local network 110 are independent from one and other. Server network 108 and local network 110 can include, for example, a local area network (LAN), a wide area network (WAN), such as the internet, a cellular network, or any combination of the preceding, and can further include wired, wireless, and/or fiber optic connections.

Client device 106 may be a laptop computer, a tablet computer, a specialized computer server, a smart phone, or any programmable electronic device capable of communication with local server computer 104A and local server computer 104B via local network 110 and with various components and devices with the distributed data processing environment. For discussion purposes, the user of client device 106 requests to download a file from central server computer 102 across local server computer 104A and local server computer 104B. Content manager 112 can receive the request to download the file through user interface 118 of client device 106. Content manager 112 can receive the request to download or upload a file through user interface 118 of client device 106.

User interface 118 provides an interface between a user of client device 106 and content manager 112. User interface 118 may be a graphical user interface (GUI) or a web user interface (WUI) and can display text, documents, web browser windows, user options, application interfaces, and instructions for operation, and includes the information (such as graphic, text, and sound) a program presents to a user and the control sequences the user employs to control the program. User interface 118 may also be mobile application software that provides an interface between a user of client device 106 and content manager 112. Mobile application software, or an "app", is a computer program designed to run on smart phones, tablet computers and other mobile devices. Content manager 112 can receive the request to download or upload a file through user interface 118 of client device 106.

Figure 2:
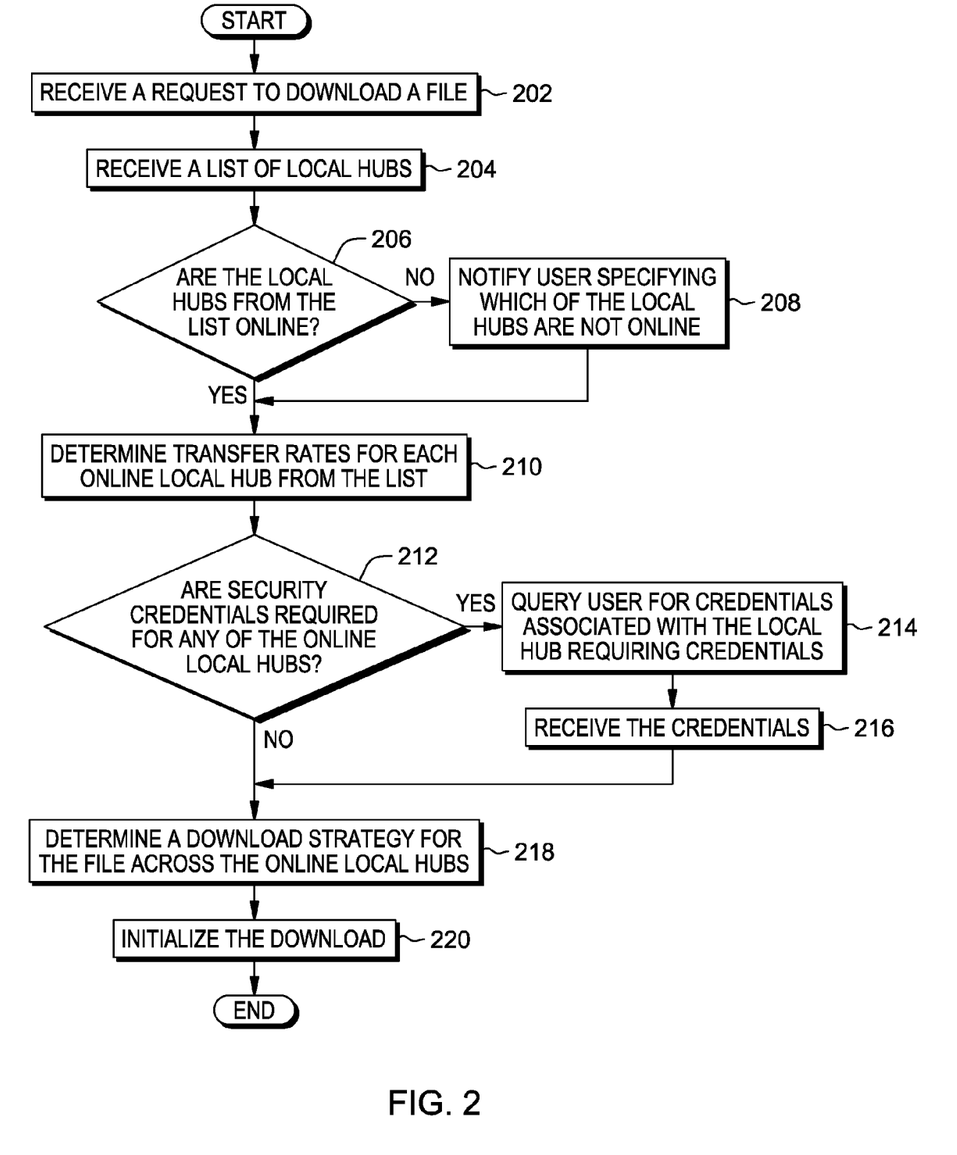
FIG. 2 is a flowchart depicting operational steps of a content manager determining a download strategy, in accordance with an embodiment of the present invention.

FIG. 2 is a flowchart depicting operational steps of a content manager determining a download strategy, in accordance with an embodiment of the present invention.

In this embodiment, content manager 112 can determine upload and download strategies for files located on central server computer 102 across local hubs such as, local server computer 104A and 104B. Content manager 112 can receive a request to upload or download a file from a user of client device 106 and can receive a list of local hubs and an amount of time the user of client device 106 is expecting to be connected to at each local hub. Content manager 112 can query each local hub from the received list of local hubs to determine which local hubs are online, transfer rates for files at each local hub, and whether security credentials are required at each of the local hubs. Subsequently, content manager 112 can determine an upload and download strategy for the file across the online local hubs from the received list of local hubs.

Content manager 112 receives a request to download a file (step 202). In this embodiment, content manager 112 receives a request from the user of client device 106 to download a file located on central server computer 102. The file can represent any form of content, for example, a music file or a video file. In another embodiment, content manager 112 receives a request from the user of client device 106 to upload a file to central server computer 102, where the file is to be storage in storage 114.

Content manager 112 receives a list of local hubs (step 204). In this embodiment, local hubs represent local server computers (i.e. local server computer 104A and 104B) to which the user of client device 106 is expecting to be connected to allow for the downloading of the file. Content manager 112 receives the list of local hubs, where the list includes local server computer 104A and 104B. Along with the list of local hubs, content manager 112 also receives an amount of time the user of client device 106 is expecting to be connected to at each local hub from the list of local hubs. For example, content manager 112 can receive a list of local hubs and amount of times from a user of client device 106, where the user expects client device 106 to be connected to local server computer 104A for 10 minutes and local server computer 104B for 5 minutes.

In another embodiment, content manager 112 can query connectivity history of client device 106 to determine any patterns of connectivity with a particular local hub. For example, a user of client device 106 disconnects with a first local hub at an average time of day of 8:00 AM. Content manager 112 can determine the amount of time the user of client device 106 is going to be connected to the first hub by calculating the difference between the average time of day client device 106 disconnects and the time a request to download a file was received. So, if the request to download a file was received at 7:54 AM, content manager 112 determines client device 106 is going to be connected to the first local hub for 6 minutes based on the connectivity history of client device 106.

Content manager 112 determines if the local hubs from the list are online (decision step 206). In the event, content manager 112 determines there is at least one local hub from the list that is not online ("no" branch, step 206), content manager 112 notifies the user specifying which of the local hubs are not online (step 208). In the event, content manager 112 determines the local hubs from the list are online ("yes" branch, step 206), content manager 112 determines transfer rates for each online local hub from list (step 210). In this embodiment, both local server computer 104A and local server computer 104B from the received list of local hubs are online.

Content manager 112 notifies the user specifying which of the local hubs are not online (step 208). Content manager 112 can identify which of the local hubs from the received list of local hubs is either offline or is expected to be offline and display the information in user interface 118 of client device 106. Content manager 112 can continue the process of determining a download strategy for the file across the local hubs that are online.

Content manager 112 determines transfer rates for each online local hub from the list (step 210). In this embodiment, content manager 112 queries local server computer 104A and 104B to obtain transfer rates for each online local hub. Operational information 116A and 116B provide historical and current data for local server computer 104A and 104B. In this embodiment, the historical and current data include downloading rates for a file across local server computer 104A and 104B. For example, a historical downloading rate across local server computer 104A is 10 Mbps, while a historical downloading rate across local server computer 104B is 25 Mbps. In other embodiment, content manager 112 utilizes other parameters such as, an amount of connected devices, an amount of available bandwidth, scheduled online and offline intervals, and reliability measures for downloading and uploading files to influence the downloading strategy across local hubs. For example, local server computer 104B has a higher download rate of 25 Mbps compared to a download rate of 10 Mbps for local server computer 104A, but local server computer 104B is less reliable than local server computer 104A due to connectivity issues. Content manager 112 can utilizes the received historical data to determine a download strategy that favors connectivity reliability over downloading rates.

Content manager 112 determines if security credentials are required for any of the online local hubs (decision step 212). In the event, content manager 112 determines security credentials are required for at least one of the online local hubs ("yes" branch, step 212), content manager 112 queries the user for credentials associated with the local hub requiring credentials (step 214). In the event, content manager 112 determines security credentials are not required for any of the online local hubs ("no" branch, step 212), content manager 112 determines a download strategy for the file across the online local hubs (step 218).

Content manager 112 queries the user for credentials associated with the local hub requiring credentials (step 214). In this embodiment, content manager 112 requests that the user of client device 106 provide the required security credentials associated with local server computer 104B to ensure the downloading of the file is not interrupted. Content manager 112 can prompt a window in user interface 118 on client device 106 for a user to enter the necessary security credentials. Upon entering the user entering the necessary security credentials, content manager 112 receives the credentials (step 216) and can verify the received credentials to determine if the security credentials entered by the user of client device 106 match the security credentials required to access local server computer 104B.

Content manager 112 determines a download strategy for the file across the online local hubs (step 218). In this embodiment, content manager 112 received a request to download a 5 GB file across local server computer 104A and 104B, where the user of client device 106 is going to be connected to local server computer 104A for 5 minutes and local server computer 104B for 10 minutes. The transfer rates for local server computer 104A and 104B are 5 Mbps and 10 Mbps, respectively. Content manager 112 can determine a download strategy that sends a first portion of the file equaling 1.5 GB to local server computer 104A and a second portion of the file equaling 3.5 GB to local server computer 104B. As previously mentioned, other parameters can weigh in on content manager 112 determining a downloading strategy. For example, content manager 112 can determine to send a smaller portion of a file to a first hub where historically, the first hub experiences a greater amount of connectivity issues when compared to a second hub.

Content manager 112 initializes the download (step 220). In this embodiment, content manager 112 initializes the download according to the determined download strategy in step 218. Content manager 112 can split the file into portions, such that the file does not become corrupt during the download across local server computer 104A and 104B.

Figure 3:
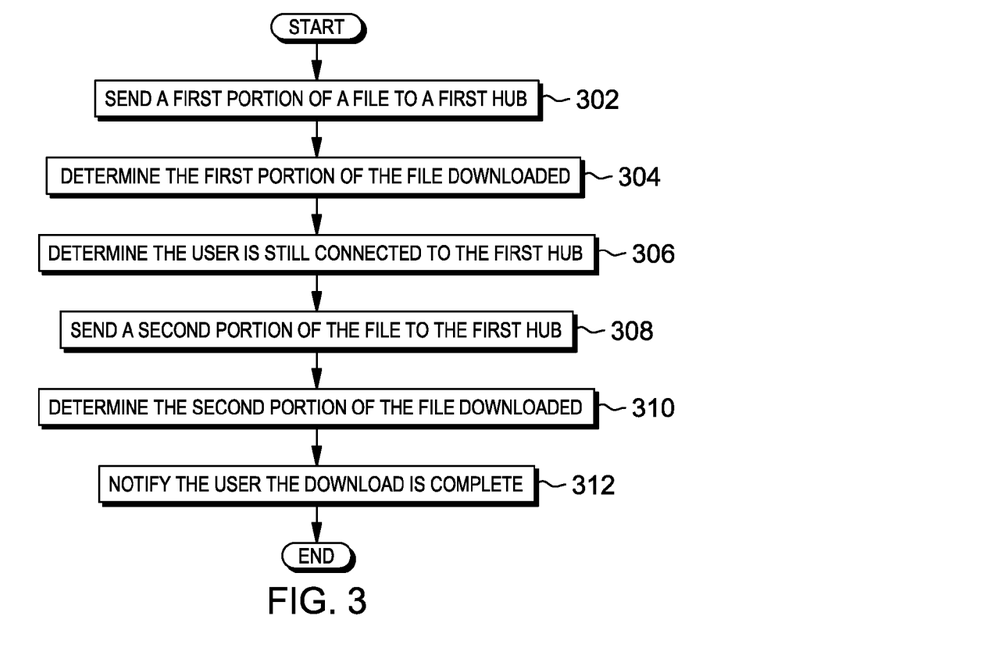
FIG. 3 is a flowchart depicting operational steps for an example scenario of a content manager utilizing a download strategy across a first hub, in accordance with an embodiment of the present invention.

FIG. 3 is a flowchart depicting an example scenario of operational steps for a content manager utilizing a download strategy across a first hub, in accordance with an embodiment of the present invention.

Content manager 112 sends a first portion of a file to a first hub (step 302). In this embodiment, utilizing a previously determined download strategy, content manager 112 sends a first portion of a file to local server computer 104A for a user of client device 106 to download. Since content manager 112 previously determined local server computer 104A is online and requires no security credentials, local server computer 104A can perform the download of the first portion to client device 106.

Content manager 112 determines the first portion of the file downloaded (step 304). In this embodiment, content manager 112 receives a confirmation that the first portion of the file downloaded at local server computer 104A. Content manager 112 determines the user is still connected to the first hub (step 306). In this embodiment, content manager 112 can query local server computer 104A to determine if client device is still connected to the first hub. Since content manager 112 determines the user (i.e., client device 106) is still connected to the first hub, content manager 112 can alter the downloading strategy to send the second portion of the file to the first hub to complete the download of the file. In this embodiment, the downloading strategy is altered because the downloading rates at local server computer 104A were greater when compared to the historical downloading rates that content manager 112 used in determining the downloading strategy. In another embodiment, the downloading strategy is altered because the user of client device 106 stayed connected to local server computer 104A longer than the specified time that content manager 112 received a request to download a file when determining the downloading strategy.

Content manager 112 sends a second portion of the file to the first hub (step 308). In this embodiment, utilizing an altered download strategy, content manager 112 sends the second portion of the file to local server computer 104A for the user of client device 106 to download. Since content manager 112 previously determined local server computer 104A is online and requires no security credentials, local server computer 104A performs the download of the second portion to client device 106.

Content manager 112 determines the second portion of the file downloaded (step 310). In this embodiment, content manager 112 receives a confirmation that the second portion of the file downloaded at local server computer 104A. Content manager 112 notifies the user the download is complete (step 312). In this embodiment, content manager 112 can prompt a message in user interface 118 on client device 106 notifying the user the file download is complete.

Figure 4:
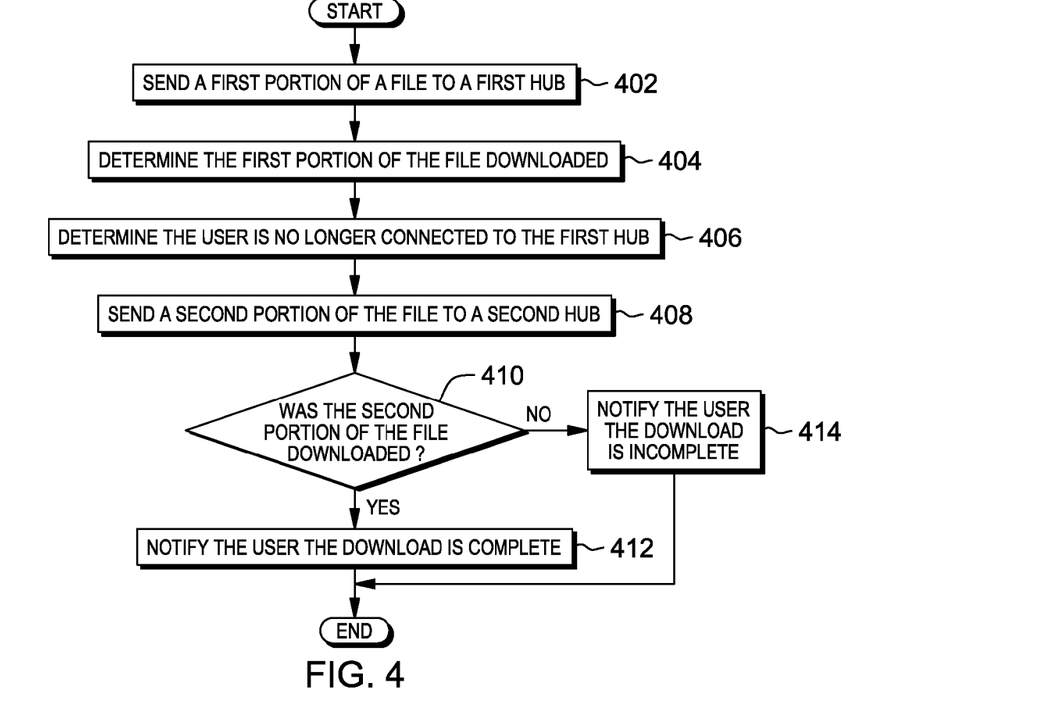
FIG. 4 is a flowchart depicting operational steps for an example scenario of a content manager utilizing a download strategy across multiple hub, in accordance with an embodiment of the present invention.

FIG. 4 is a flowchart depicting an example scenario of operational steps for a content manager utilizing a download strategy across multiple hub, in accordance with an embodiment of the present invention.

Content manager 112 sends a first portion of a file to a first hub (step 402). In this embodiment, utilizing a previously determined download strategy, content manager 112 sends a first portion of a file to local server computer 104A for a user of client device 106 to download. Since content manager 112 previously determined local server computer 104A is online and requires no security credentials, local server computer 104A can perform the download of the first portion of the file to client device 106.

Content manager 112 determines the first portion of the file downloaded (step 404). In this embodiment, content manager 112 receives a confirmation that the first portion of the file downloaded at local server computer 104A. Content manager 112 determines the user is no longer connected to the first hub (step 406). In this embodiment, content manager 112 can query local server computer 104A to determine if client device is still connected to the first hub. Since content manager 112 determines the user (i.e., client device 106) is no longer connected to the first hub, content manager 112 continues with the original downloading strategy to send the second portion of the file to a second hub to complete the download of the file.

Content manager 112 sends a second portion of the file to a second hub (step 408). In this embodiment, utilizing the original download strategy, content manager 112 sends the second portion of the file to local server computer 104B for the user of client device 106 to download. Since content manager 112 previously determined local server computer 104B is online and requires security credentials, content manager 112 inputs the security credentials allowing local server computer 104B to perform the download of the second portion of the file to client device 106.

Content manager 112 determines if the second portion of the file downloaded (decision step 410). In the event content manager 112 determines the second portion of the file was downloaded ("yes" branch, step 410), content manager 112 notifies the user the download is complete (step 412). In the event content manager 112 determines the second portion of the file was not downloaded ("no" branch, step 410), content manager 110 notifies the user the download is incomplete (step 414).

Content manager 112 notifies the user the download is complete (step 412). In this embodiment, content manager 112 can prompt a message in user interface 118 on client device 106 notifying the user the file download is complete.

Content manager 112 notifies the user the download is incomplete (step 414). In this embodiment, content manager 112 can prompt a message in user interface 118 on client device 106 notifying the user the file download is incomplete. Content manager 112 can also query the user of client device for a list of additional local hubs to which client device 106 can connect to in order to complete the download of the second portion of the file. Content manager 112 can alter the downloading strategy for the file to include the additional local hubs after proceeding with operational steps previously discussed in FIG. 2.

Figure 5:
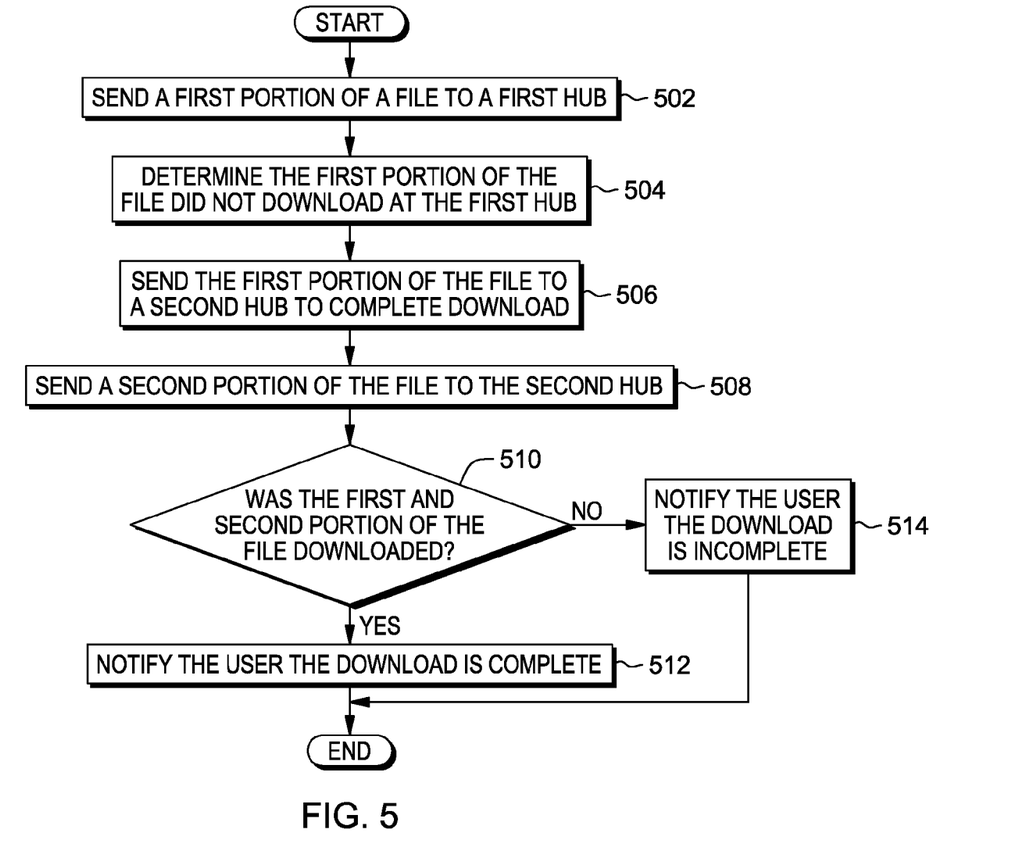
FIG. 5 is a flowchart depicting operational steps for another example scenario of a content manager utilizing a download strategy across multiple hubs, in accordance with an embodiment of the present invention.

FIG. 5 is a flowchart depicting operational steps for another example scenario of a content manager utilizing a download strategy across multiple, in accordance with an embodiment of the present invention.

Content manager 112 sends a first portion of a file to a first hub (step 502). In this embodiment, utilizing a previously determined download strategy, content manager 112 sends a first portion of a file to local server computer 104A for a user of client device 106 to download. Since content manager 112 previously determined local server computer 104A is online and requires no security credentials, local server computer 104A can perform the download of the first portion to client device 106.

Content manager 112 determines the first portion of the file did not download at the first hub (step 504). In this embodiment, content manager 112 determines that the first portion of the file did not download due to a connection being lost between local server computer 104A and client device 106. Content manager 112 can identify what fragment of the first portion did not download at local sever computer 104A prior to client device 106 loss of connectivity. Since content manager 112 determines the user (i.e. client device 106) is no longer connected to the first hub, content manager 112 can alter the downloading strategy to send the fragment of the first portion of the file to the second hub to complete the download of the file. In this embodiment, the downloading strategy is altered because the downloading rates at local server computer 104A were lower when compared to historical downloading rates content manager 112 used in determining the downloading strategy. In another embodiment, the downloading strategy is altered because the user of client device 106 did not stay connected to local server computer 104A as long as the specified time that content manager 112 received when determining the downloading strategy.

Content manager 112 sends the first portion of the file to a second hub to complete download (step 506). In this embodiment, utilizing the altered download strategy, content manager 112 sends the identified fragment of the first portion to the local server computer 104B to complete the download. Since content manager 112 previously determined local server computer 104B is online and requires security credentials, content manager 112 inputs the security credentials allowing local server computer 104B to perform the download of the fragment of the first portion that was not previously downloaded to client device 106.

Content manager 112 sends a second portion of the file to the second hub (step 508). In this embodiment, utilizing the altered download strategy, content manager 112 sends the second portion of the file to local server computer 104B for the user of client device 106 to download. Upon receiving the second portion of the file, local server computer 104B can download the second portion of the file to client device 106.

Content manager 112 determines if the first and second portion of the file downloaded (decision step 510). In the event content manager 112 determines the first and second portion of the file was downloaded ("yes" branch, step 510), content manager 112 notifies the user the download is complete (step 512). In the event content manager 112 determines the first and second portion of the file was not downloaded ("no" branch, step 510), content manager 110 notifies the user the download is incomplete (step 514).

Content manager 112 notifies the user the download is complete (step 512). In this embodiment, content manager 112 can prompt a message in user interface 118 on client device 106 notifying the user the file download is complete.

Content manager 112 notifies the user the download is incomplete (step 514). In this embodiment, content manager 112 can prompt a message in user interface 118 on client device 106 notifying the user the file download is incomplete. Content manager 112 can also query the user of client device for a list of additional local hubs to which client device 106 can connect to in order to complete the download of the second portion of the file. Content manager 112 can alter the downloading strategy for the file to include the additional local hubs after proceeding with operational steps previously discussed in FIG. 2.

Figure 6:
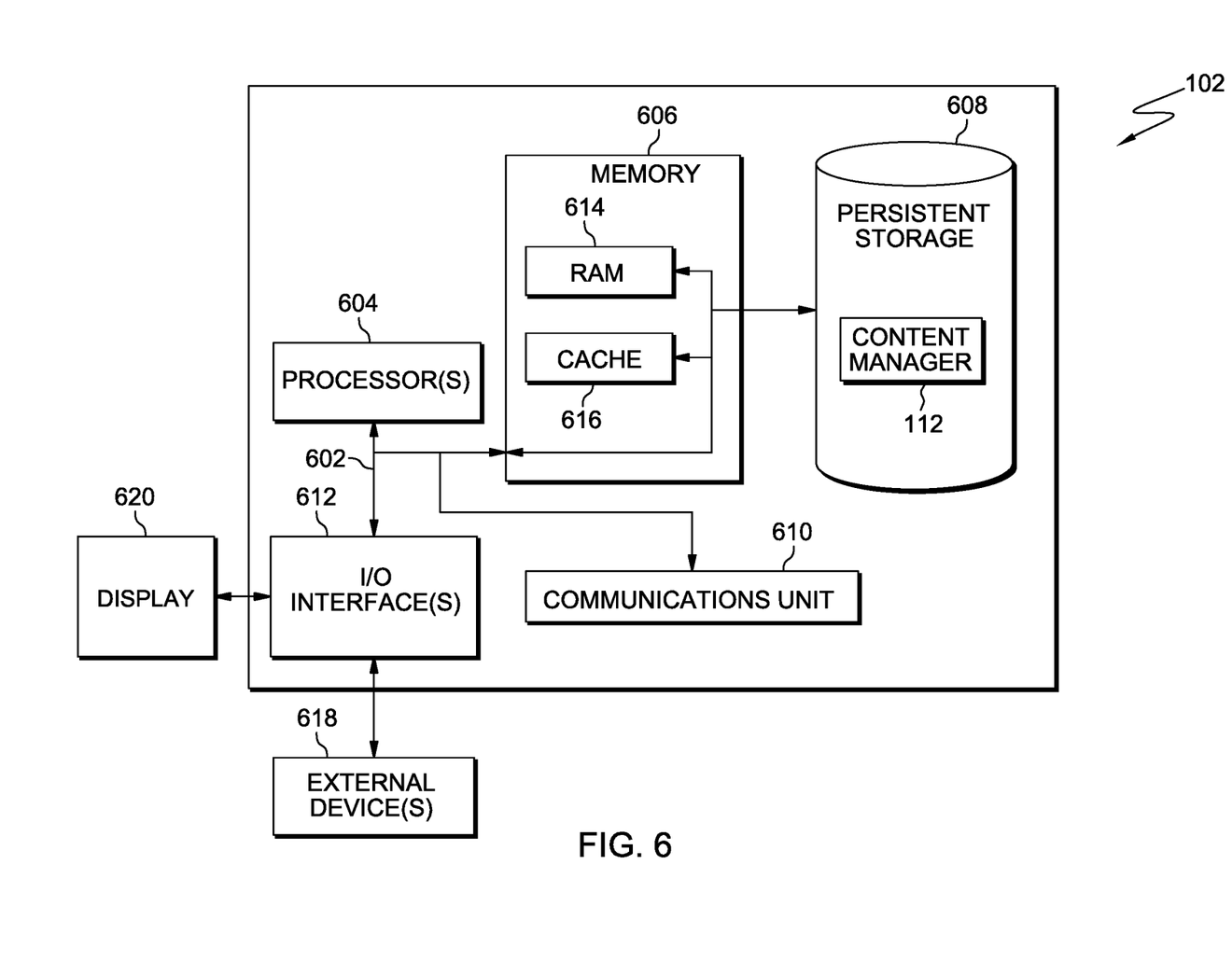
FIG. 6 is a block diagram of components of a computer system, such as the computer server of FIG. 1, in accordance with an embodiment of the present invention.

FIG. 6 depicts a block diagram of components of a computer, such as central server computer 102, content manager 112 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Central server computer 102 include communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are examples of computer readable tangible storage devices. A storage device is any piece of hardware that is capable of storing information, such as, data, program code in functional form, and/or other suitable information on a temporary basis and/or permanent basis. In this embodiment, memory 606 includes random access memory (RAM) 614 and cache memory 616. In general, memory 606 can include any suitable volatile or non-volatile computer readable storage device.

Content manager 112 is stored in persistent storage 608 for execution by one or more of computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including systems and devices within or controlled by central server computer 102. In these examples, communications unit 610 includes one or more wireless network interface cards. Communications unit 610 may provide communications through the use of either or both physical and wireless communications links. Computer programs and processes, such as content manager 112, may be downloaded to persistent storage 608 through communications unit 610, or uploaded to another system through communications unit 610.

I/O interface(s) 612 allows for input and output of data with other devices that may be connected to central server computer 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 may also connect to a display 620. Display 620 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for content management across multiple server computers, the method comprising:
   receiving, by one or more processors, operational information associated with each of two or more local server computers, wherein the operational information includes data transfer rates, an amount of available bandwidth, reliability measures for the transfer of data, and scheduled online and offline intervals;
   determining, by one or more processors, a strategy for transferring a file between a central server computer and a client device using the two or more local server computers based, at least in part, on the operational information associated with each of the two or more local server computers;
   transferring, by one or more processors, based on the strategy, a first portion of the file between a first local server computer and the central server computer, wherein the first local server computer is one of the two or more local server computers; and
   transferring, by one or more processors, based on the strategy, a second portion of the file between a second local server computer and the central server computer, wherein the second local server computer is one of the two or more local server computers.

2. The method of claim 1, wherein the determining of the strategy for transferring the file is based, at least in part, on a received request to transfer the file between the central server computer and the client device and on a received list of the two or more local server computers, wherein the two or more local server computers transfer the file between the central server computer and the client device.

3. The method of claim 1, wherein the determining of the strategy for transferring the file is based, at least in part, on a received duration of connectivity between each of the two or more local server computers and the client device.

4. The method of claim 1, further comprising:
   determining, by one or more processors, if security credentials are required for the two or more local server computers; and
   responsive to determining security credentials are required for at least one of the two or more local server computers, sending, by one or more processors, a query for security credentials associated with the at least one of the two or more local server computers.

5. The method of claim 1, further comprising:
   determining, by one or more processors, if the two or more local server computers are online; and
   responsive to determining at least one of the two or more local server computers is not online, sending, by one or more processors, a notification indicating that the at least one of the two or more local server computers is not online.

6. The method of claim 1, further comprising:
   determining, by one or more processors, the first portion of the file did not transfer between the first local server computer and the client device;
   determining, by one or more processors, to alter the strategy, wherein the altered strategy transfers the first portion of the file between the second local server computer and the central server computer; and transferring, by one or more processors, based on the altered strategy, the first portion of the file between the second local server computer and the central server computer.

7. The method of claim 1, further comprising:
determining, by one or more processors, the first portion of the file did transfer at the first local server computer;
determining, by one or more processors, to alter the strategy, wherein the altered strategy transfers the second portion of the file between the first local server computer and the central server computer; and
sending, by one or more processors, based on the altered strategy, the second portion of the file between the first local server computer and the central server computer.

8. A computer program product for content management across multiple server computers, the computer program product comprising:
one or more computer readable tangible storage media and program instructions stored on at least one of the one or more storage media, the program instructions comprising:
program instructions to receive operational information associated with each of two or more local server computers, wherein the operational information includes data transfer rates, an amount of available bandwidth, reliability measures for the transfer of data, and scheduled online and offline intervals;
program instructions to determine a strategy for transferring a file between a central server computer and a client device using the two or more local server computers based, at least in part, on the operational information associated with each of the two or more local server computers;
program instructions to transfer, based on the strategy, a first portion of the file between a first local server computer and the central server computer, wherein the first local server computer is one of the two or more local server computers; and
program instructions to transfer, based on the strategy, a second portion of the file between a second local server computer and the central server computer, wherein the second local server computer is one of the two or more local server computers.

9. The computer program product of claim 8, wherein program instructions to determine the strategy for transferring the file is based, at least in part, on a received request to transfer the file between the central server computer and the client device and on a received list of the two or more local server computers, wherein the two or more local server computers transfer the file between the central server computer and the client device.

10. The computer program product of claim 8, wherein program instructions to determine the strategy for transferring the file is based, at least in part, on a received duration of connectivity between each of the two or more local server computers and the client device.

11. The computer program product of claim 8, wherein the program instructions further comprise:
program instructions to determine if security credentials are required for the two or more local server computers; and
program instructions to, responsive to determining security credentials are required for at least one of the two or more local server computers, send a query for security credentials associated with the at least one of the two or more local server computers.

12. The computer program product of claim 8, wherein the program instructions further comprise:
program instructions to determine if the two or more local server computers are online; and
program instructions to, responsive to determining at least one of the two or more local server computers is not online, send a notification indicating that the at least one of the two or more local server computers is not online.

13. The computer program product of claim 8, wherein the program instructions further comprise:
program instructions to determine the first portion of the file did not transfer between the first local server computer and the client device;
program instructions to determine to alter the strategy, wherein the altered strategy transfers the first portion of the file between the second local server computer and the central server computer; and
program instructions to transfer, based on the altered strategy, the first portion of the file between the second local server computer and the central server computer.

14. The computer program product of claim 8, wherein the program instructions further comprise:
program instructions to determine the first portion of the file did transfer between the first local server computer and the client device;
program instructions to determine to alter the strategy, wherein the altered strategy sends the second portion of the file between the first local server computer and the central server computer; and
program instructions to transfer, based on the altered strategy, the second portion of the file between the first local server computer and the central server computer.

15. A computer system for content management across multiple server computers, the computer system comprising:
one or more computer processors;
one or more computer readable storage media; and
program instructions stored on the computer readable storage media for execution by at least one of the one or more computer processors, the program instructions comprising:
program instructions to receive operational information associated with each of two or more local server computers, wherein the operational information includes data transfer rates, an amount of available bandwidth, reliability measures for the transfer of data, and scheduled online and offline intervals;
program instructions to determine a strategy for transferring a file between a central server computer and a client device using the two or more local server computers based, at least in part, on the operational information associated with each of the two or more local server computers;
program instructions to transfer, based on the strategy, a first portion of the file between a first local server computer and the central server computer, wherein the first local server computer is one of the two or more local server computers; and
program instructions to transfer, based on the strategy, a second portion of the file between a second local server computer and the central server computer, wherein the second local server computer is one of the two or more local server computers.

16. The computer system of claim 15, wherein program instructions to determine the strategy for transferring the file is based, at least in part, on a received request to transfer the file between the central server computer and the client device and on a received list of the two or more local server computers, wherein the two or more local server computers transfer the file between the central server computer and the client device.

17. The computer system of claim 15, wherein program instructions to determine the strategy for transferring the file is based, at least in part, on a received duration of connectivity between each of the two or more local server computers and the client device.

18. The computer system of claim 15, wherein the program instructions further comprise:

program instructions to determine if security credentials are required for the two or more local server computers; and program instructions to, responsive to determining security credentials are required for at least one of the two or more local server computers, send a query for security credentials associated with the at least one of the two or more local server computers.

19. The computer system of claim 15, wherein the program instructions further comprise:

program instructions to determine the first portion of the file did not transfer between the first local server computer and the client device;

program instructions to determine to alter the strategy, wherein the altered strategy transfers the first portion of the file between the second local server computer and the central server computer; and program instructions to transfer, based on the altered strategy, the first portion of the file between the second local server computer and the central server computer.

20. The computer system of claim 15, wherein the program instructions further comprise:

program instructions to determine the first portion of the file did transfer between the first local server computer and the client device;

program instructions to determine to alter the strategy, wherein the altered strategy sends the second portion of the file between the first local server computer and the central server computer; and program instructions to transfer, based on the altered strategy, the second portion of the file between the first local server computer and the central server computer.

* * * * *